(12) United States Patent
Yoshida

(10) Patent No.: US 12,449,248 B2
(45) Date of Patent: Oct. 21, 2025

(54) WALL THINNING DETECTION SYSTEM, WALL THINNING DETECTION METHOD AND NON-TRANSITORY COMPUTER READABLE STORAGE MEDIUM

(71) Applicant: Yokogawa Electric Corporation, Musashino (JP)

(72) Inventor: Hideki Yoshida, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 845 days.

(21) Appl. No.: 17/688,121

(22) Filed: Mar. 7, 2022

(65) Prior Publication Data

US 2022/0290966 A1  Sep. 15, 2022

(30) Foreign Application Priority Data

Mar. 10, 2021 (JP) .................. 2021-038480

(51) Int. Cl.
*G01B 7/06* (2006.01)
(52) U.S. Cl.
CPC ...................... *G01B 7/10* (2013.01)
(58) Field of Classification Search
CPC ......................................................... G01B 7/10
See application file for complete search history.

(56) References Cited

U.S. PATENT DOCUMENTS 4,990,851 A * 2/1991 Spies ................ G01B 7/10
324/230

FOREIGN PATENT DOCUMENTS

| EP | 3537144 A1 | 9/2019 |
| JP | 2012-247194 A | 12/2012 |
| WO | 2015/179237 A1 | 11/2015 |

OTHER PUBLICATIONS

Nakasumi et al., "Inverse Analysis of Multiple Cracks Using Magnetic Flux Leakage Considering the Size of Flux Gate Sensor", Journal of the Japan Society of Applied Electromagnetics and Mechanics, (2013), vol. 21, No. 1. Cited in Specification. (10 pages).
Mao Bingyi et al: "Signal processing and defect analysis of pipeline inspection applying magnetic flux leakage methods", Intelligent Service Robotics, Springer Berlin Heidelberg, Berlin/Heidelberg, vol. 7, No. 4, Aug. 9, 2014 (Aug. 9, 20141), pp. 203-209, XP035395081, ISSN: 1861-2776, DOI: 10.1007/S11370-014-0158-6; Cited in European Search Report dated Jul. 19, 2022.

* cited by examiner

*Primary Examiner* — Minh Q Phan
(74) *Attorney, Agent, or Firm* — WHDA, LLP

(57) ABSTRACT

A wall thinning detection system includes a polarized magnetic charge distribution computing unit configured to compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors, and a wall thinning distribution computing unit configured to compute a wall thinning distribution in the monitoring area based on the spatial distribution of the polarized magnetic charges calculated by the polarized magnetic charge distribution computing unit.

18 Claims, 5 Drawing Sheets

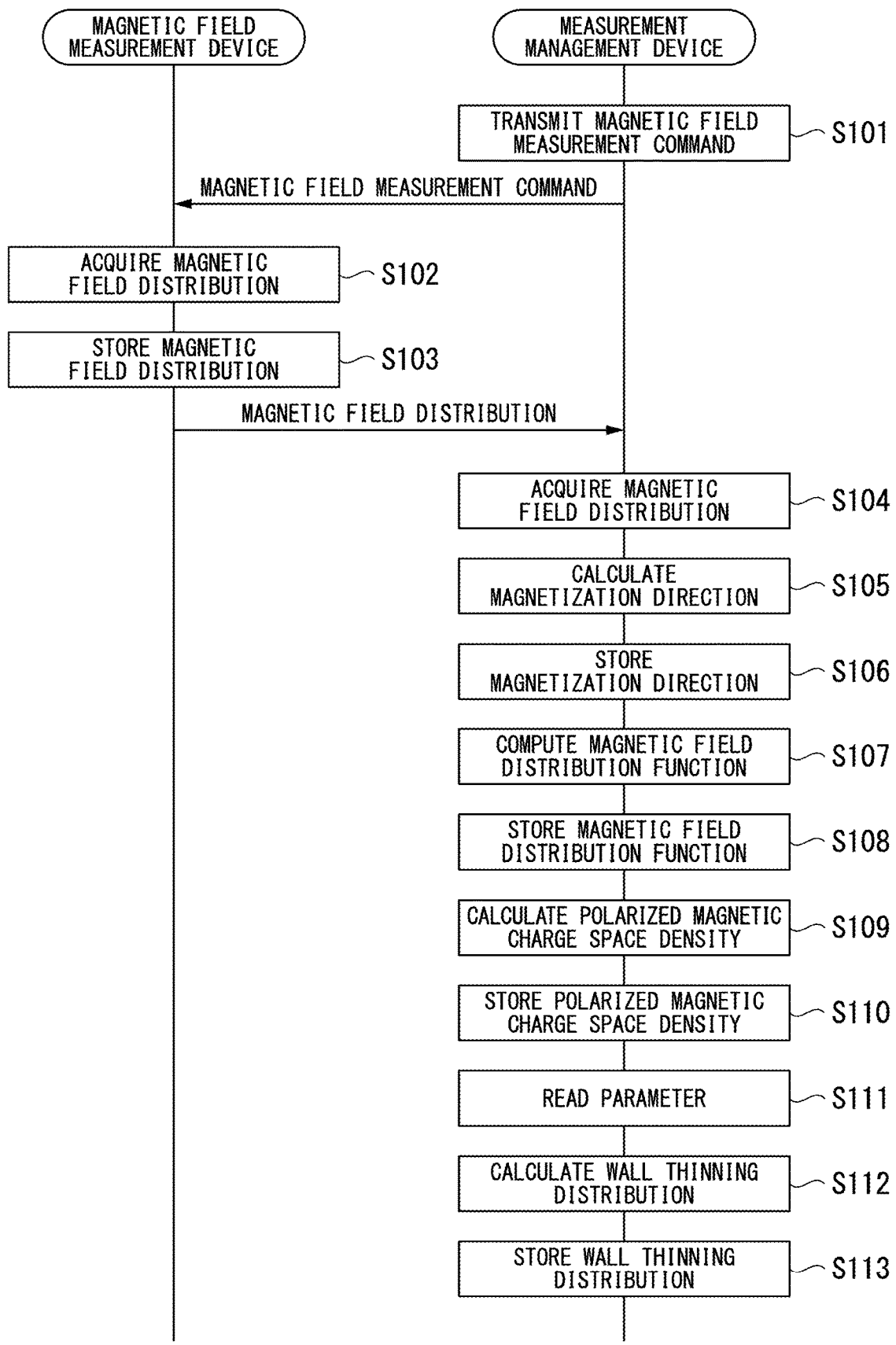

WALL THINNING DETECTION SYSTEM, WALL THINNING DETECTION METHOD AND NON-TRANSITORY COMPUTER READABLE STORAGE MEDIUM

BACKGROUND

Field of the Invention

The present invention relates to a wall thinning detection system, a wall thinning detection method and a non-transitory computer readable storage medium.

Priority is claimed on Japanese Patent Application No. 2021-038480, filed on Mar. 10, 2021, the contents of which are incorporated herein by reference.

Description of Related Art

In an instrument made of a metal (hereinafter referred to as a "metal instrument") used in petroleum and petrochemical plants and the like, a phenomenon called wall thinning in which the wall thickness becomes thin due to local corrosion or the like may occur. If this wall thinning progresses, there is a risk of holes opening in the metal instrument. Therefore, it is necessary to detect wall thinning caused by local corrosion or the like at an early stage in metal instruments spread over an entire plant.

PCT International Publication No. WO 2015/179237 and "Inverse Analysis of Multiple Cracks Using Magnetic Flux Leakage Considering the Size of Flux Gate Sensor," Journal of the Japan Society of AEM, Vol. 21, No. 1 (2013) disclose conventional technologies for detecting wall thinning of a metal instrument. For example, in the system described in PCT International Publication No. WO 2015/179237, using the fact that the static magnetic field decreases in a part in which wall thinning occurs, it is possible to detect wall thinning by pattern matching between a magnetic field strength pattern when wall thinning has occurred (hereinafter referred to as a "wall thinning pattern") and a magnetic field strength pattern detected by a magnetic field sensor.

However, in the system described in PCT International Publication No. WO 2015/179237, even if the presence of wall thinning of a metal instrument can be detected, it may not be possible to estimate a three-dimensional shape of wall thinning. This is because the wall thinning pattern changes depending on shape information such as the planar shape and the depth of the wall thinning and the distance between the magnetic field sensor and the wall thinning (hereinafter referred to as a "standoff"). Here, if various wall thinning shapes and wall thinning patterns for each standoff have been prepared in advance, it may be possible to estimate a three-dimensional shape of wall thinning. However, since the shapes of wall thinning are diverse, a very large number of wall thinning patterns are required, which is not realistic.

SUMMARY

A wall thinning detection system may include: a polarized magnetic charge distribution computing unit configured to compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and a wall thinning distribution computing unit configured to compute a wall thinning distribution in the monitoring area based on the spatial distribution of the polarized magnetic charges calculated by the polarized magnetic charge distribution computing unit.

Further features and aspects of the present disclosure will become apparent from the following detailed description of exemplary embodiments with reference to the attached drawings.

BRIEF DESCRIPTION OF THE DRAWINGS

FIG. 7 is a flowchart of a wall thinning detection system according to one embodiment of the present invention.

DETAILED DESCRIPTION OF THE INVENTION

Figure 1:
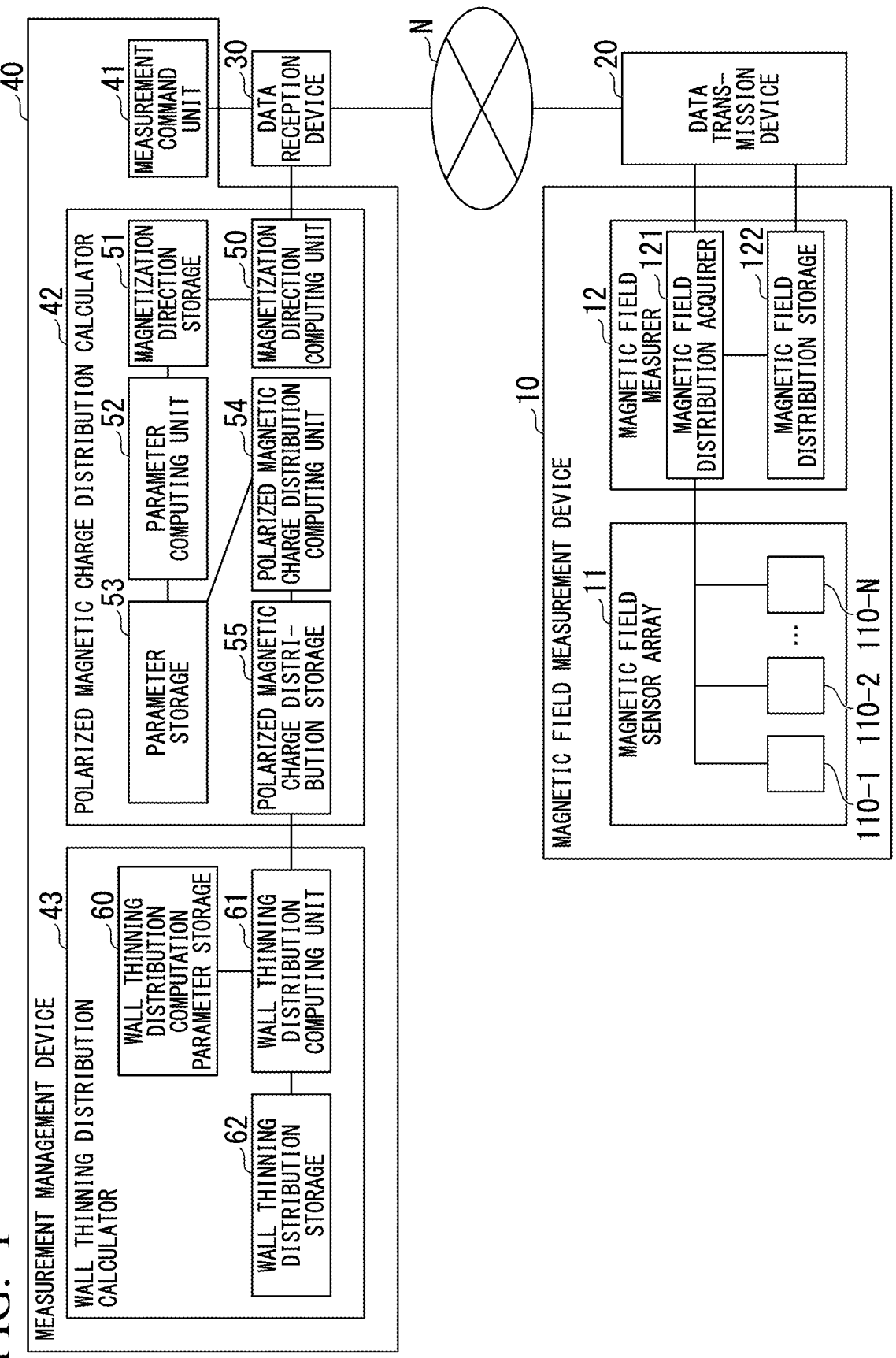
FIG. 1 is a block diagram showing a main part configuration of a wall thinning detection system according to one embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a wall thinning detection system, a wall thinning detection method and a non-transitory computer readable storage medium through which it is possible to estimate a three-dimensional shape of wall thinning.

A wall thinning detection system, a wall thinning detection method and a non-transitory computer readable storage medium according to embodiments of the present invention will be described below in detail with reference to the drawings. Hereinafter, first, the outline of the embodiment of the present invention will be described, and the embodiment of the present invention will be then described in detail.

Outline

According to the embodiment of the present invention, it is possible to estimate a three-dimensional shape of wall thinning in a monitoring area in a metal instrument such as a metal pipe. For example, even if the wall thinning pattern changes depending on shape information such as the planar shape and the depth of the wall thinning or a standoff, it is possible to estimate a three-dimensional shape of wall thinning.

In the technology disclosed in PCT International Publication No. WO 2015/179237, it is not possible to estimate the shape (2D shape) or depth of the wall thinning. Therefore, it is necessary to perform an approach of preparing a very large number of wall thinning patterns in advance that can correspond to various wall thinning shapes and standoffs, which is not realistic. That is, in the technology disclosed in PCT International Publication No. WO 2015/179237, it may not be possible to estimate the shape (2D shape) or depth of the wall thinning, and it may not be possible to estimate a three-dimensional shape of wall thinning naturally.

"Inverse Analysis of Multiple Cracks Using Magnetic Flux Leakage Considering the Size of Flux Gate Sensor," Journal of the Japan Society of AEM, Vol. 21, No. 1 (2013) discloses a technology in which it is possible to detect the presence of wall thinning on a plane of a metal instrument to be examined and it is possible to estimate the shape of the wall thinning. However, the above technology disclosed in "Inverse Analysis of Multiple Cracks Using Magnetic Flux Leakage Considering the Size of Flux Gate Sensor," Journal of the Japan Society of AEM, Vol. 21, No. 1 (2013) does not disclose estimation of a three-dimensional shape of wall thinning. In addition, since the number of magnetic dipole lattice points in the metal instrument is large, sensor noise of magnetic field sensors tends to affect estimation of a wall thinning shape of a pipe, and when the wall thinning shape is estimated, the error becomes large. For example, in order to estimate the three-dimensional wall thinning shape, the magnetic dipole lattice points are disposed not only in a 2D plane but also in a 3D space. Then, the number of magnetic dipole lattice points may be larger than the number of observation points (the positions of the magnetic field sensors) of the static magnetic field. In addition, in consideration of commercialization, it is necessary to reduce the number of magnetic field sensors and reduce costs, and the number of observation points is thus reduced. Therefore, even if the disposition interval of the magnetic dipoles is widened, the number of lattice points is larger than the number of observation points. Therefore, when magnetic sensors are used for a long time in an external environment such as a plant, sensor noise becomes large, and it is difficult to estimate a three-dimensional shape of wall thinning from a small number of observation points of the static magnetic field.

In addition, in the technology of "Inverse Analysis of Multiple Cracks Using Magnetic Flux Leakage Considering the Size of Flux Gate Sensor," Journal of the Japan Society of AEM, Vol. 21, No. 1 (2013), lattice points are disposed by magnetic dipoles being discretized in the depth direction. Therefore, discretization error occurs when the depth of the wall thinning is estimated.

The wall thinning detection system according to the embodiment of the present invention uses a magnetic field distribution of a static magnetic field in a predetermined area of a metal instrument measured by a plurality of magnetic field sensors and calculates a polarized magnetic charge spatial distribution in the predetermined area. Then, the wall thinning detection system according to the embodiment of the present invention computes a wall thinning distribution in a monitoring area based on the polarized magnetic charge spatial distribution. Thereby, it is possible to estimate a three-dimensional shape of wall thinning in a predetermined area of the metal instrument without using pattern matching. In addition, since the wall thinning detection system according to the embodiment of the present invention uses polarized magnetic charges that continuously approximate magnetic dipoles, it is possible to prevent the occurrence of discretization error, and it is possible to estimate the depth of the wall thinning with high accuracy.

Details

<Wall Thinning Detection System>

FIG. 1 is a block diagram showing a main part configuration of a wall thinning detection system according to one embodiment of the present invention. As shown in FIG. 1, a wall thinning detection system 1 according to the present embodiment includes a magnetic field measurement device 10, a data transmission device 20, a data reception device 30, and a measurement management device 40.

The magnetic field measurement device 10 measures a magnetic field distribution of a static magnetic field in a predetermined area of the metal instrument. Then, the magnetic field measurement device 10 transmits the measured magnetic field distribution in the predetermined area of the metal instrument from the data transmission device 20 to the measurement management device 40. This metal instrument may be made of a ferromagnetic material, and may be, for example, a pipe made of a metal installed in petroleum and petrochemical plants (hereinafter referred to as a "metal pipe"), a tank, a reinforcing bar or the like. In the present embodiment, a case in which the metal instrument is a metal pipe made of a ferromagnetic material will be described.

Hereinafter, an example of a schematic configuration of the magnetic field measurement device 10 according to one embodiment of the present invention will be described. As shown in FIG. 1, the magnetic field measurement device 10 includes a magnetic field sensor array 11 and a magnetic field measurer 12.

Figure 2:
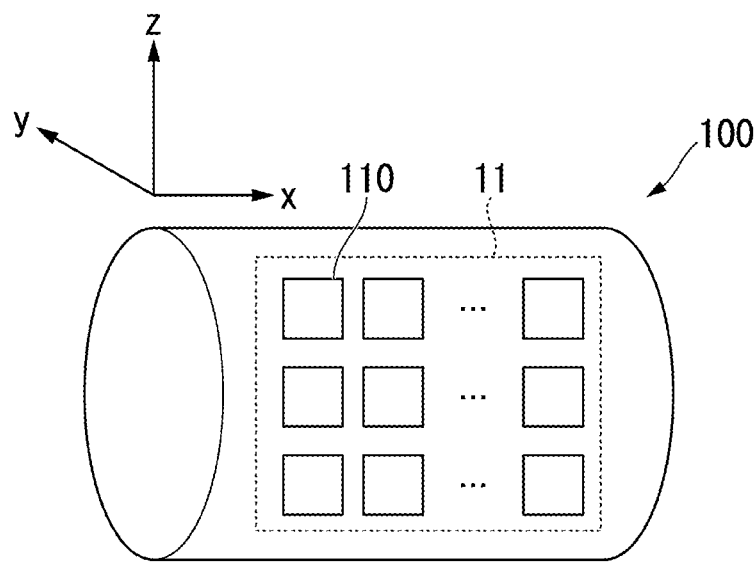
FIG. 2 is a diagram showing an attachment position of a magnetic field sensor array according to one embodiment of the present invention.

The magnetic field sensor array 11 includes a plurality of magnetic field sensors 110 (magnetic field sensors 110-1, 110-2, . . . 110-N(N is an integer)). FIG. 2 is a diagram showing an attachment position of the magnetic field sensor array 11 according to one embodiment of the present invention. Here, a position at which each magnetic field sensor 110 is installed (hereinafter referred to as a "sensor position") corresponds to an observation point.

The plurality of magnetic field sensors 110 each measure a magnetic field density. As shown in FIG. 2, when monitoring whether wall thinning has occurred in a predetermined area (hereinafter referred to as a "monitoring area") 100 of the metal instrument, the magnetic field sensor array 11 measures a magnetic field spatial distribution of the static magnetic field (hereinafter referred to as a "magnetic field distribution") in the monitoring area 100. Here, in the present embodiment, the magnetic field sensors 110 may be disposed in contact with the surface of the monitoring area 100 or may be installed at positions a predetermined distance s away from each other. In addition, the distances s between the magnetic field sensors 110 and the surface of the monitoring area 100 may be all constant or different from each other. The plurality of magnetic field sensors 110 output the measured magnetic field densities to the magnetic field measurer 12. Here, the x-axis direction shown in FIG. 2 may be referred to as a longitudinal direction of the metal pipe, the y-axis direction may be referred to as a circumferential direction (or a lateral direction) of the metal pipe, and the z-axis direction may be referred to as a normal direction of the surface of the metal pipe.

Referring to FIG. 1, the magnetic field measurer 12 includes a magnetic field distribution acquirer 121 and a magnetic field distribution storage 122.

The magnetic field distribution acquirer 121 acquires the magnetic field distribution in the monitoring area 100 measured by the magnetic field sensor array 11. Then, the magnetic field distribution acquirer 121 stores the magnetic field densities measured by the plurality of magnetic field sensors 110 in the magnetic field distribution storage 122.

The data transmission device 20 transmits information to the data reception device 30 via a communication network N. For example, when the data transmission device 20 receives a magnetic field measurement command, which is a command to execute measurement, from the data reception device 30, it transmits the magnetic field distribution (hereinafter referred to as a "magnetic field data") acquired by the magnetic field distribution acquirer 121 to the data reception device 30.

The communication network N may be a wireless communication transmission line (for example, a wireless LAN), a wired communication transmission line, or a combination of a wireless communication transmission line and a wired communication transmission line. The communication network N may be a mobile communication network such as a mobile phone network, a wireless packet communication network, the Internet, a dedicated line, or a combination thereof. For example, regarding the communication network N, a low-power wide area network (LPWAN) may be used, or a short-range wireless communication standard such as ZigBee (registered trademark), Wi-Fi (registered trademark), or BLE may be used.

The data reception device 30 transmits the magnetic field measurement command from the measurement management device 40 to the data transmission device 20 via the communication network N. The data reception device 30 receives the magnetic field data from the data transmission device 20 via the communication network N.

Figure 3:
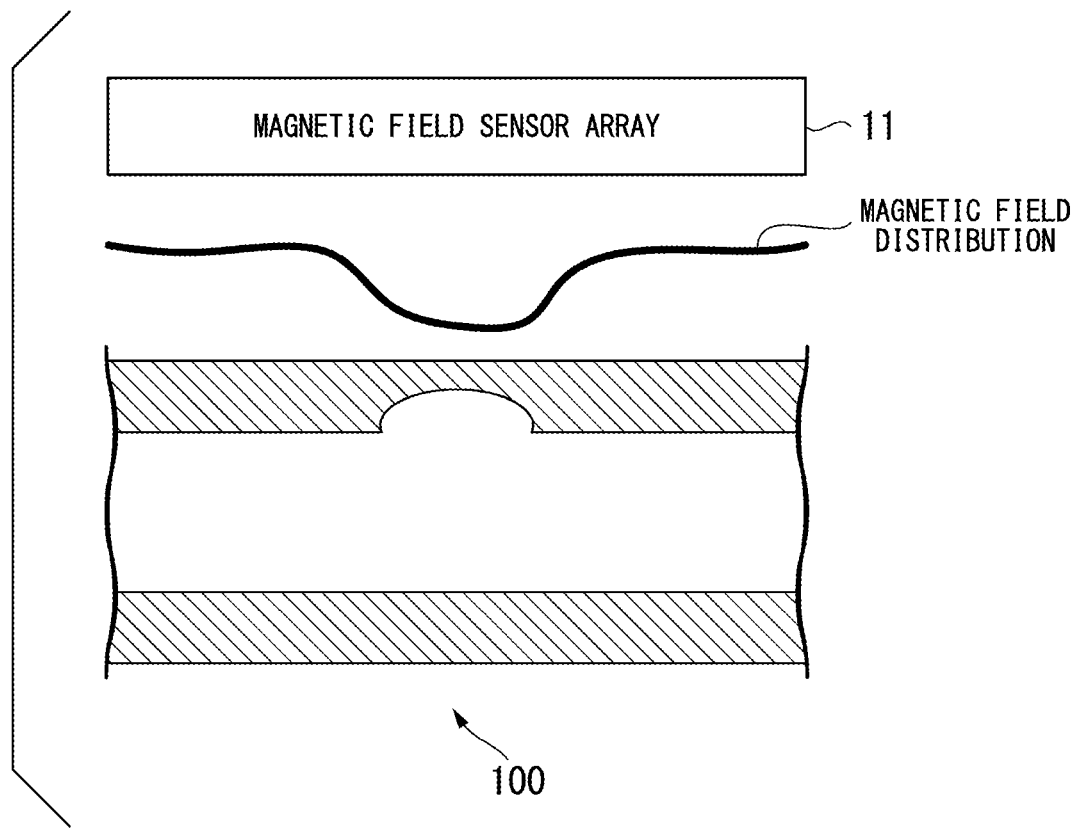
FIG. 3 is a diagram illustrating an example of a magnetic field distribution according to one embodiment of the present invention.
Figure 4:
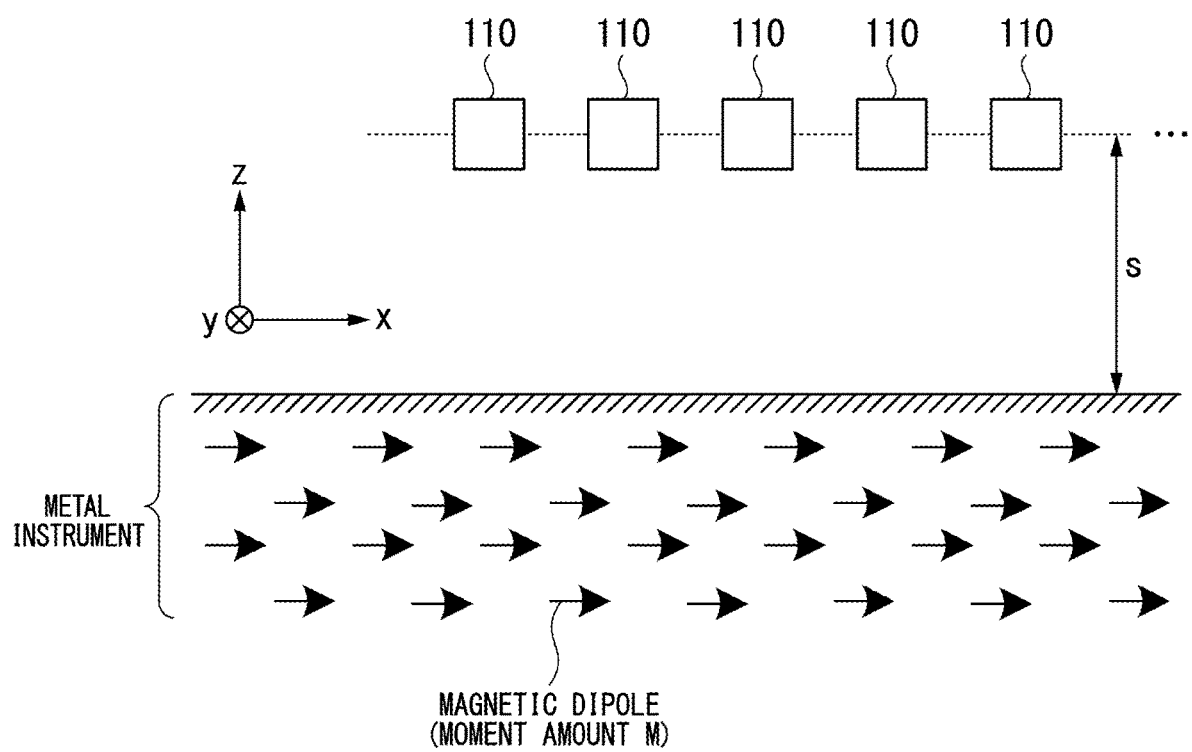
FIG. 4 is a schematic diagram of a spatial distribution of magnetic dipoles according to one embodiment of the present invention.

The measurement management device 40 detects a three-dimensional shape of wall thinning of a metal instrument using the residual magnetic field of the metal instrument. FIG. 3 is a diagram illustrating an example of a magnetic field distribution according to one embodiment of the present invention. FIG. 4 is a schematic diagram of a spatial distribution of magnetic dipoles according to one embodiment of the present invention.

The metal pipe has a residual magnetic field and can be regarded as having a uniform magnetic dipole therein. The magnetic dipole is a pair of small positive and negative magnetic poles, in other words, a small magnet. In the present embodiment, it is assumed that the density of magnetic dipoles is uniformly distributed throughout the metal pipe. In this assumption, if no wall thinning occurred in the metal pipe, the spatial distribution of the magnetic dipoles of the metal pipe is uniform. Here, this magnetic dipole can be regarded as an eddy current that flows in a loop shape. That is, the spatial distribution of magnetic dipoles can be regarded as the spatial distribution of the eddy current that flows in a loop shape.

The measurement management device 40 computes a distribution of polarized magnetic charges (hereinafter referred to as a "polarized magnetic charge spatial distribution") in a 3D area in which wall thinning has occurred (hereinafter referred to as a "wall thinning area") based on the magnetic field data received by the data reception device 30. Then, the measurement management device 40 computes a wall thinning distribution in the monitoring area 100 from the polarized magnetic charge spatial distribution.

Figure 5:
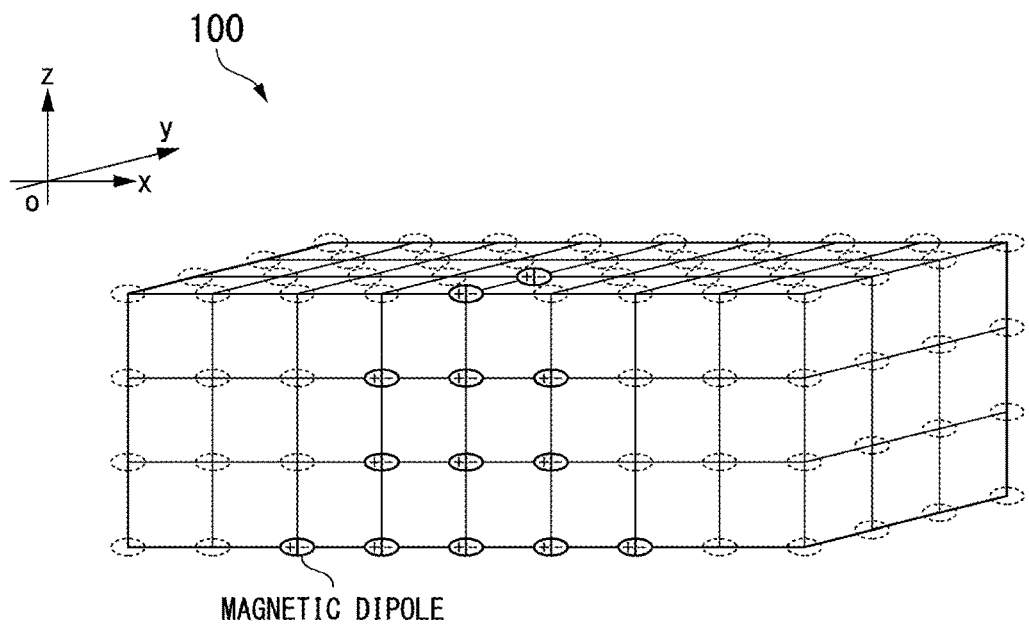
FIG. 5 is a diagram showing a magnetic dipole model according to one embodiment of the present invention.

FIG. 5 is a diagram showing magnetic dipole lattice points that are three-dimensionally disposed in the monitoring area 100. In FIG. 5, magnetic dipoles in the wall thinning area are disposed at lattice points. The magnetic field distribution from the wall thinning can be obtained by subtracting the magnetic field distribution after the wall thinning has occurred from the magnetic field distribution before wall thinning occurs. Here, when the magnetic dipoles in the wall thinning area is modeled from the magnetic field distribution from this wall thinning, as shown in FIG. 5, a model in which magnetic dipoles are disposed at lattice points in the wall thinning area among lattice points of unit lattices that divide the monitoring area 100 (hereinafter referred to as a "magnetic dipole model") is obtained. However, in this magnetic dipole model, the number of lattice points at which magnetic dipoles are disposed may be larger than the number of observation points (the positions of the magnetic field sensors) of the static magnetic field.

Figure 6:
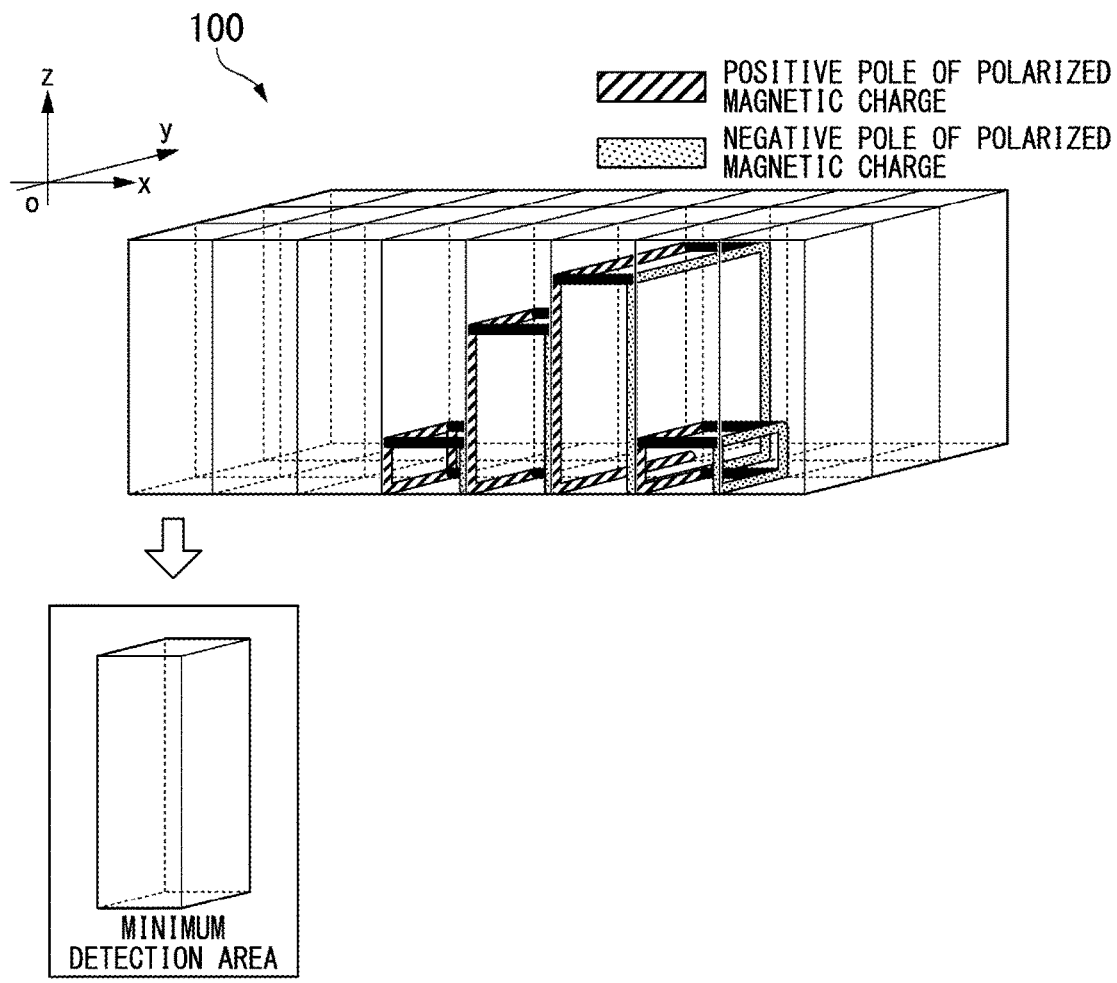
FIG. 6 is a diagram showing a polarized magnetic charge model according to one embodiment of the present invention.

The measurement management device 40 uses a model approximated by continuously disposing magnetic dipoles in units of minimum detection areas as exemplified in FIG. 6 (hereinafter referred to as a "polarized magnetic charge model") instead of the magnetic dipole model exemplified in FIG. 5. For example, the measurement management device 40 generates a polarized magnetic charge model based on the magnetic field distribution measured by the magnetic field measurement device 10.

The minimum detection area corresponds to the resolution of the wall thinning shape to be detected, and is an area larger than the unit lattice in which magnetic dipoles are arranged at lattice points. That is, the monitoring area 100 of the polarized magnetic charge model is divided in a lattice pattern by a minimum detection area larger than the unit lattice. Therefore, in the polarized magnetic charge model, the number of lattice points of polarized magnetic charges can be made smaller than the number of observation points of the static magnetic field. In the present embodiment, the size of the minimum detection area is set so that the number of observation points is larger than the number of lattice points of the monitoring area 100. The measurement management device 40 obtains polarized magnetic charges in the minimum detection area that divides the monitoring area 100. The height of each polarized magnetic charge in the z-axis direction corresponds to the depth of the wall thinning. Therefore, the measurement management device 40 can determine the height of the polarized magnetic charge in each minimum detection area of the wall thinning area and thus determine the depth of the wall thinning.

Referring to FIG. 1, a main part configuration of the measurement management device 40 will be described. The measurement management device 40 includes a measurement command unit 41, a polarized magnetic charge distribution calculator 42 and a wall thinning distribution calculator 43. These components may be realized by, for example, a hardware processor such as a central processing unit (CPU) that executes a program (software). In addition, some or all of these components may be realized by hardware (including circuit unit; circuitry) such as a large scale integrated circuit (LSI), an application specific integrated circuit (ASIC), a field-programmable gate array (FPGA), and a graphics processing unit (GPU) or may be realized in cooperation of software and hardware. The program may be stored in advance in a storage device (a storage device including a non-transitory storage medium) such as a hard disk drive (HDD) or a flash memory, or may be stored in a removable storage medium (a non-transitory storage medium) such as a DVD or a CD-ROM, and installed in the storage device when the storage medium is mounted in a drive device. The storage device is composed of, for example, an HDD, a flash memory, an electrically erasable programmable read only memory (EEPROM), a read only memory (ROM), or a random access memory (RAM). For example, the measurement management device 40 is realized by a computer, for example, a personal computer or a workstation.

The measurement command unit 41 transmits a magnetic field measurement command to the magnetic field distribution acquirer 121 via the data reception device 30. For example, the measurement command unit 41 transmits a magnetic field measurement command at a timing designated by a user in advance.

The polarized magnetic charge distribution calculator 42 includes a magnetization direction computing unit 50, a magnetization direction storage 51, a parameter computing unit 52, a parameter storage 53, a polarized magnetic charge distribution computing unit 54, and a polarized magnetic charge distribution storage 55.

The magnetization direction computing unit 50 reads the magnetic field distribution stored in the magnetic field distribution storage 122 and calculates the magnetization direction of the metal instrument based on the read magnetic field distribution. For example, the magnetization direction computing unit 50 calculates the magnetization direction of the metal instrument based on the magnetic field distribution using a known technology. The magnetization direction computing unit 50 stores the information about the calculated magnetization direction of the metal instrument in the magnetization direction storage 51. Here, if the magnetization direction is known, information about the magnetization direction may be stored in the magnetization direction storage 51 in advance.

The parameter computing unit 52 computes a function indicating the distribution of the magnetic field at each sensor position at which a single polarized magnetic charge is generated (hereinafter referred to as a "magnetic field distribution function") based on the information about the magnetization direction stored in the magnetization direction storage 51, the position of each magnetic field sensor 110, and information including the position and magnetization amount in each minimum detection area and the like. In the example shown in FIG. 6, since the detection area is divided into 24 minimum detection areas, the parameter computing unit 52 obtains 24 magnetic field distribution functions for one sensor position. The parameter computing unit 52 stores the calculated magnetic field distribution function in the parameter storage 53.

The parameter storage 53 stores information such as a magnetic field distribution function, a regularization function of a mathematical programming problem, and a weight parameter of a regularization term of a mathematical programming problem.

The polarized magnetic charge distribution computing unit 54 computes a polarized magnetic charge spatial distribution by solving an inverse problem using the magnetic field distribution function, the regularization function of the mathematical programming problem, and the weight parameter of the regularization term of the mathematical programming problem stored in the parameter storage 53 and the magnetic field distribution measured by the magnetic field measurement device 10. For example, the polarized magnetic charge distribution computing unit 54 obtains an estimated value of the magnetic flux density at each sensor position based on the magnetic field distribution function stored in the parameter storage 53. That is, the polarized magnetic charge distribution computing unit 54 obtains an estimated value of the magnetic flux density generated by the metal instrument having a polarized magnetic charge spatial distribution at each sensor position. Then, the polarized magnetic charge distribution computing unit 54 calculates a polarized magnetic charge spatial distribution by solving the mathematical programming problem (optimization problem) so that a difference between the measured value of the magnetic flux density at each sensor position (the magnetic flux density measured by each magnetic field sensor 110) and the estimated value of the magnetic flux density at each sensor position becomes optimal. The polarized magnetic charge distribution computing unit 54 stores the calculated polarized magnetic charge spatial distribution in the polarized magnetic charge distribution storage 55.

The wall thinning distribution calculator 43 includes a wall thinning distribution computation parameter storage 60, a wall thinning distribution computing unit 61, and a wall thinning distribution storage 62.

The wall thinning distribution computation parameter storage 60 stores parameters such as a magnetization amount in the monitoring area 100 and a magnetic permeability of each minimum detection wall thinning unit.

The wall thinning distribution computing unit 61 acquires the polarized magnetic charge spatial distribution from the polarized magnetic charge distribution storage 55. Then, the wall thinning distribution computing unit 61 calculates the wall thinning distribution in the monitoring area 100 based on the acquired polarized magnetic charge spatial distribution. The wall thinning distribution is a distribution in the z-axis direction of the wall thinning, that is, the depth of the wall thinning, and the spread of the distribution indicates the surface shape of the wall thinning. Therefore, the wall thinning distribution computing unit 61 can estimate a three-dimensional shape of wall thinning by calculating the wall thinning distribution in the monitoring area 100.

The wall thinning distribution computing unit 61 may calculate the wall thinning distribution in the monitoring area 100 using, for example, the polarized magnetic charge spatial distribution stored in the polarized magnetic charge distribution storage 55 and a certain coefficient $\alpha$. The coefficient $\alpha$ is a parameter for changing from the polarized magnetic charge spatial distribution to the wall thinning distribution. For example, the coefficient $\alpha$ is a value determined by parameters such as the magnetization amount and the magnetic permeability stored in the wall thinning distribution computation parameter storage 60. For example, the wall thinning distribution computing unit 61 may calculate the wall thinning distribution by multiplying the polarized magnetic charge spatial distribution by the coefficient $\alpha$.

<Wall Thinning Detection Method>

Next, operations of the wall thinning detection system 1 will be described. FIG. 7 is a flowchart showing an outline of an operation of calculating the wall thinning distribution of the wall thinning detection system 1 according to one embodiment of the present invention.

When a preset time is reached, or based on an instruction from the user, the measurement command unit 41 transmits a magnetic field measurement command to the magnetic field distribution acquirer 121 via the data reception device 30 (Step S101). When the magnetic field measurement command is received, the magnetic field distribution acquirer 121 drives the magnetic field sensors 110 of the magnetic field sensor array 11, and thus acquires the magnetic field distribution from the magnetic field sensor array 11 (Step S102). The magnetic field distribution acquirer 121 stores the magnetic field distribution acquired from the magnetic field sensor array 11 in the magnetic field distribution storage 122 (Step S103).

The measurement management device 40 acquires the magnetic field distribution stored in the magnetic field distribution storage 122 via the data reception device 30 (Step S104). The magnetization direction computing unit 50 calculates a magnetization direction of the metal instrument based on the magnetic field distribution measured by the magnetic field sensor array 11 (Step S105). Then, the magnetization direction computing unit 50 stores information about the calculated magnetization direction of the metal instrument in the magnetization direction storage 51 (Step S106).

The parameter computing unit 52 computes a magnetic field distribution function indicating the distribution of the magnetic field at each sensor position at which a single polarized magnetic charge is generated based on the information about the magnetization direction stored in the magnetization direction storage 51, the position of each magnetic field sensor 110, the position of each minimum detection area, and information including the magnetization amount in the monitoring area 100 and the like (Step S107). Here, for example, the size and position of the minimum detection area may be set in advance by the user. The parameter computing unit 52 stores the computed magnetic field distribution function in the parameter storage 53 (Step S108).

The polarized magnetic charge distribution computing unit 54 reads the magnetic field distribution function, the regularization function of the mathematical programming problem, and the weight parameter of the regularization term of the mathematical programming problem from the parameter storage 53. Then, the polarized magnetic charge distribution computing unit 54 uses a least-squares method from the information such as the magnetic field distribution stored in the magnetic field distribution storage 122 and the magnetic field distribution function read from the parameter storage 53 and calculates the polarized magnetic charge space density in the wall thinning area (Step S109). The polarized magnetic charge distribution computing unit 54 stores the polarized magnetic charge space density in the polarized magnetic charge distribution storage 55 (Step S110).

The wall thinning distribution computing unit 61 reads parameters such as the polarized magnetic charge space density stored in the polarized magnetic charge distribution storage 55 and the magnetization amount in the monitoring area 100 stored in the wall thinning distribution computation parameter storage 60 and the like (Step S111). The wall thinning distribution computing unit 61 calculates the wall thinning distribution based on the read parameters such as the polarized magnetic charge space density and the magnetization amount (Step S112). The wall thinning distribution computing unit 61 stores the calculated wall thinning distribution in the wall thinning distribution storage 62 (Step S113). For example, the wall thinning distribution stored in the wall thinning distribution storage 62 is displayed on a display device or output to another information processing device.

As described above, the wall thinning detection system 1 according to the present embodiment detects the wall thinning of the monitoring area 100 using the magnetic field distribution in the monitoring area of the metal instrument measured by the magnetic field sensor array 11 including the plurality of magnetic field sensors 110. The wall thinning detection system 1 computes the polarized magnetic charge spatial distribution based on the magnetic field distribution measured by the magnetic field sensor array and computes the wall thinning distribution in the monitoring area 100 based on the computed polarized magnetic charge spatial distribution. Thereby, the wall thinning detection system 1 can estimate a three-dimensional shape of wall thinning of the monitoring area 100.

For example, the wall thinning detection system 1 computes the polarized magnetic charge spatial distribution based on the magnetic field distribution measured by the magnetic field sensor array and computes the wall thinning distribution in the monitoring area 100 based on the computed polarized magnetic charge spatial distribution. Thereby, since the wall thinning detection system 1 does not need to use the pattern matching disclosed in PCT International Publication No. WO 2015/179237 when it detects the wall thinning of the monitoring area 100, the wall thinning can be detected within a practical computation time.

In addition, when the magnetic field sensor 110 is used for a long time in an external environment, sensor noise increases. In the technology disclosed in "Inverse Analysis of Multiple Cracks Using Magnetic Flux Leakage Considering the Size of Flux Gate Sensor," Journal of the Japan Society of AEM, Vol. 21, No. 1 (2013), since many magnetic dipole lattice points are disposed in a 3D space, the number of parameters to be estimated is larger than the number of measurement points of the magnetic field sensor 110. When the number of parameters to be estimated increases, estimation is easily affected by the sensor noise, and the estimation error of the wall thinning shape increases. Therefore, when the technology disclosed in "Inverse Analysis of Multiple Cracks Using Magnetic Flux Leakage Considering the Size of Flux Gate Sensor," Journal of the Japan Society of AEM, Vol. 21, No. 1 (2013) is applied to the wall thinning detection system on the assumption that the magnetic field sensor 110 is used for a long time, the estimation error of the wall thinning shape becomes large. When the wall thinning shape is estimated, the wall thinning detection system 1 according to the present embodiment uses the spatial distribution of the polarized magnetic charges, which is a continuous approximation of a plurality of magnetic dipoles, instead of the spatial distribution of the magnetic dipoles, and thus reduces the number of lattice points used in calculation, and reduces the number of parameters to be estimated. Then, the wall thinning detection system 1 can set the number of observation points not to be larger than the number of lattice points (lattice points of the minimum detection area) without changing the resolution. Thereby, the wall thinning detection system 1 can reduce the estimation error of the wall thinning shape and improve the estimation performance of the wall thinning shape.

In addition, in the technology described in "Inverse Analysis of Multiple Cracks Using Magnetic Flux Leakage Considering the Size of Flux Gate Sensor," Journal of the Japan Society of AEM, Vol. 21, No. 1 (2013), magnetic dipoles are discretely disposed in the z-axis direction. Therefore, a discretization error occurs when the wall thinning depth is estimated. In the present embodiment, since the polarized magnetic charge is used, no discretization error occurs in the wall thinning depth direction.

In addition, the wall thinning detection system 1 according to the present embodiment may include the magnetization direction computing unit 50 that computes a magnetization direction of the metal instrument. Thereby, the magnetization direction of the metal instrument is automatically calculated, and even if there is no information about the magnetization of the metal instrument such as a pipe, it is possible to calculate the shape of the wall thinning. In addition, the wall thinning detection system 1 according to the present embodiment can calculate the wall thinning depth simply by actually measuring the magnetization amount (scalar quantity).

While the embodiments of the invention have been described above in detail with reference to the drawings, specific configurations are not limited to the embodiments, and include designs and the like without departing from the spirt and scope of the invention.

Supplementary Note (1) One aspect of the present invention provides a wall thinning detection system which may include: a polarized magnetic charge distribution computing unit configured to compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and a wall thinning distribution computing unit configured to compute a wall thinning distribution in the monitoring area based on the spatial distribution of the polarized magnetic charges calculated by the polarized magnetic charge distribution computing unit.

(2) In the wall thinning detection system according to (1), the monitoring area may be divided in a lattice pattern in a minimum detection area, and the polarized magnetic charges may be approximated by continuously disposing the plurality of magnetic dipoles in a unit of a minimum detection area.

(3) In the wall thinning detection system according to (2), a size of the minimum detection area may be set so that a number of observation points, which is a number of the magnetic field sensors, is larger than a number of lattice points of the monitoring area.

(4) The wall thinning detection system according to any one of (1) to (3) may further include: a magnetization direction computing unit configured to compute a magnetization direction of the metal instrument; and a parameter computing unit configured to compute a magnetic field distribution function based on information including the magnetization direction, the magnetic field distribution function indicating a magnetic field distribution at a position of each of the magnetic field sensors at which a single polarized magnetic charge is generated. The polarized magnetic charge distribution computing unit may be configured to compute the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors.

(5) In the wall thinning detection system according to (4), the polarized magnetic charge distribution computing unit may be configured to calculate the spatial distribution of the polarized magnetic charges by solving a mathematical programming problem so that a difference between the estimated value and the measured value is a minimum.

(6) In the wall thinning detection system according to any one of (1) to (5), the wall thinning distribution computing unit may be configured to calculate a wall thinning distribution in the monitoring area based on the spatial distribution of the polarized magnetic charges and a coefficient set from information including a magnetization amount in the monitoring area.

(7) In the wall thinning detection system according to (5), the polarized magnetic charge distribution computing unit may be configured to compute the spatial distribution of the polarized magnetic charges by solving an inverse problem using the magnetic field distribution function, a regularization function of the mathematical programming problem, a weight parameter of a regularization term of the mathematical programming problem, and the magnetic field distribution measured by the magnetic field sensor array.

(8) The wall thinning detection system according to (1) may further include: a storage medium configured to store a program; and a hardware-processor configured to execute the program stored in the storage medium to implement the polarized magnetic charge distribution computing unit and the wall thinning distribution computing unit.

(9) One aspect of the present invention provides a wall thinning detection method which may include: computing a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and computing a wall thinning distribution in the monitoring area based on the spatial distribution of the polarized magnetic charges.

(10) In the wall thinning detection method according to (9), the monitoring area may be divided in a lattice pattern in a minimum detection area, and the polarized magnetic charges may be approximated by continuously disposing the plurality of magnetic dipoles in a unit of a minimum detection area.

(11) In the wall thinning detection method according to (10), a size of the minimum detection area may be set so that a number of observation points, which is a number of the magnetic field sensors, is larger than a number of lattice points of the monitoring area.

(12) The wall thinning detection method according to any one of (9) to (11) may further include: computing a magnetization direction of the metal instrument; computing a magnetic field distribution function based on information including the magnetization direction, the magnetic field distribution function indicating a magnetic field distribution at a position of each of the magnetic field sensors at which a single polarized magnetic charge is generated; and computing the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors.

(13) The wall thinning detection method according to (12) may further include: calculating the spatial distribution of the polarized magnetic charges by solving a mathematical programming problem so that a difference between the estimated value and the measured value is a minimum.

(14) The wall thinning detection method according to any one of (9) to (13) may further include: calculating a wall thinning distribution in the monitoring area based on the spatial distribution of the polarized magnetic charges and a coefficient set from information including a magnetization amount in the monitoring area.

(15) The wall thinning detection method according to (13) may further include: computing the spatial distribution of the polarized magnetic charges by solving an inverse problem using the magnetic field distribution function, a regularization function of the mathematical programming problem, a weight parameter of a regularization term of the mathematical programming problem, and the magnetic field distribution measured by the magnetic field sensor array.

(16) One aspect of the present invention provides a non-transitory computer readable storage medium storing a program executed by a computer, and the program may instruct the computer to: compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and compute a wall thinning distribution in the monitoring area based on the spatial distribution of the polarized magnetic charges.

(17) In the non-transitory computer readable storage medium according to (16), the monitoring area may be divided in a lattice pattern in a minimum detection area, and the polarized magnetic charges may be approximated by continuously disposing the plurality of magnetic dipoles in a unit of a minimum detection area.

(18) In the non-transitory computer readable storage medium according to (17), a size of the minimum detection area is set so that a number of observation points, which is a number of the magnetic field sensors, is larger than a number of lattice points of the monitoring area.

(19) In the non-transitory computer readable storage medium according to any one of (16) to (18), the program may further instruct the computer to: compute a magnetization direction of the metal instrument; compute a magnetic field distribution function based on information including the magnetization direction, the magnetic field distribution function indicating a magnetic field distribution at a position of each of the magnetic field sensors at which a single polarized magnetic charge is generated; and compute the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors.

(20) In the non-transitory computer readable storage medium according to (19), the program may further instruct the computer to: calculate the spatial distribution of the polarized magnetic charges by solving a mathematical programming problem so that a difference between the estimated value and the measured value is a minimum.

As described above, according to the present invention, it is possible to estimate a three-dimensional shape of wall thinning.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wall thinning detection system comprising:
   a polarized magnetic charge distribution computing unit configured to compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and
   a wall thinning distribution computing unit configured to compute a wall thinning distribution in the monitoring area based on the spatial distribution of the polarized magnetic charges calculated by the polarized magnetic charge distribution computing unit,
   wherein the monitoring area is divided in a lattice pattern in a minimum detection area,
   wherein the polarized magnetic charges are approximated by continuously disposing the plurality of magnetic dipoles in a unit of a minimum detection area,
   wherein the polarized magnetic charge distribution computing unit obtains the polarized magnetic charges in the minimum detection area, and
   wherein the wall thinning distribution computing unit determines a height of the polarized magnetic charge in each of the minimum detection area, which corresponds to a depth of the wall thinning in the monitoring area, to determine the depth of the wall thinning in the monitoring area.

2. The wall thinning detection system according to claim 1,
   wherein a size of the minimum detection area is set so that a number of observation points, which is a number of the magnetic field sensors, is larger than a number of lattice points of the monitoring area.

3. The wall thinning detection system according to claim 1, further comprising:
   a magnetization direction computing unit configured to compute a magnetization direction of the metal instrument; and
   a parameter computing unit configured to compute a magnetic field distribution function based on information including the magnetization direction, the magnetic field distribution function indicating a magnetic field distribution at a position of each of the magnetic field sensors at which a single polarized magnetic charge is generated,
   wherein the polarized magnetic charge distribution computing unit is configured to compute the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors.

4. The wall thinning detection system according to claim 3,
wherein the polarized magnetic charge distribution computing unit is configured to calculate the spatial distribution of the polarized magnetic charges by solving a mathematical programming problem so that a difference between the estimated value and the measured value is a minimum.

5. The wall thinning detection system according to claim 1,
wherein the wall thinning distribution computing unit is configured to calculate a wall thinning distribution in the monitoring area based on the spatial distribution of the polarized magnetic charges and a coefficient set from information including a magnetization amount in the monitoring area.

6. The wall thinning detection system according to claim 1, further comprising:
a storage medium configured to store a program; and
a hardware-processor configured to execute the program stored in the storage medium to implement the polarized magnetic charge distribution computing unit and the wall thinning distribution computing unit.

7. The wall thinning detection system according to claim 1,
wherein the minimum detection area is an area larger than the unit lattice in which magnetic dipoles are arranged at lattice points, respectively.

8. A wall thinning detection system comprising:
a polarized magnetic charge distribution computing unit configured to compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors;
a wall thinning distribution computing unit configured to compute a wall thinning distribution in the monitoring area based on the spatial distribution of the polarized magnetic charges calculated by the polarized magnetic charge distribution computing unit;
a magnetization direction computing unit configured to compute a magnetization direction of the metal instrument; and
a parameter computing unit configured to compute a magnetic field distribution function based on information including the magnetization direction, the magnetic field distribution function indicating a magnetic field distribution at a position of each of the magnetic field sensors at which a single polarized magnetic charge is generated,
wherein the polarized magnetic charge distribution computing unit is configured to compute the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors,
wherein the polarized magnetic charge distribution computing unit is configured to calculate the spatial distribution of the polarized magnetic charges by solving a mathematical programming problem so that a difference between the estimated value and the measured value is a minimum, and
wherein the polarized magnetic charge distribution computing unit is configured to compute the spatial distribution of the polarized magnetic charges by solving an inverse problem using the magnetic field distribution function, a regularization function of the mathematical programming problem, a weight parameter of a regularization term of the mathematical programming problem, and the magnetic field distribution measured by the magnetic field sensor array.

9. A wall thinning detection method comprising:
computing a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and
computing a wall thinning distribution in the monitoring area based on the spatial distribution of the polarized magnetic charges,
wherein the monitoring area is divided in a lattice pattern in a minimum detection area,
wherein the polarized magnetic charges are approximated by continuously disposing the plurality of magnetic dipoles in a unit of a minimum detection area, and
wherein the wall thinning detection method further comprising:
obtaining the polarized magnetic charges in the minimum detection area; and
determining a height of the polarized magnetic charge in each of the minimum detection area, which corresponds to a depth of the wall thinning in the monitoring area, to determine the depth of the wall thinning in the monitoring area.

10. The wall thinning detection method according to claim 9,
wherein a size of the minimum detection area is set so that a number of observation points, which is a number of the magnetic field sensors, is larger than a number of lattice points of the monitoring area.

11. The wall thinning detection method according to claim 9, further comprising:
computing a magnetization direction of the metal instrument;
computing a magnetic field distribution function based on information including the magnetization direction, the magnetic field distribution function indicating a magnetic field distribution at a position of each of the magnetic field sensors at which a single polarized magnetic charge is generated; and
computing the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors.

12. The wall thinning detection method according to claim 11, further comprising:
calculating the spatial distribution of the polarized magnetic charges by solving a mathematical programming problem so that a difference between the estimated value and the measured value is a minimum.

13. The wall thinning detection method according to claim 9, further comprising:

calculating a wall thinning distribution in the monitoring area based on the spatial distribution of the polarized magnetic charges and a coefficient set from information including a magnetization amount in the monitoring area.

14. A wall thinning detection method comprising:
computing a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors;
computing a wall thinning distribution in the monitoring area based on the spatial distribution of the polarized magnetic charges:
computing a magnetization direction of the metal instrument;
computing a magnetic field distribution function based on information including the magnetization direction, the magnetic field distribution function indicating a magnetic field distribution at a position of each of the magnetic field sensors at which a single polarized magnetic charge is generated;
computing the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors;
calculating the spatial distribution of the polarized magnetic charges by solving a mathematical programming problem so that a difference between the estimated value and the measured value is a minimum; and
computing the spatial distribution of the polarized magnetic charges by solving an inverse problem using the magnetic field distribution function, a regularization function of the mathematical programming problem, a weight parameter of a regularization term of the mathematical programming problem, and the magnetic field distribution measured by the magnetic field sensor array.

15. A non-transitory computer readable storage medium storing a program executed by a computer, the program instructing the computer to:
compute a spatial distribution of polarized magnetic charges, which is an aggregate of a plurality of magnetic dipoles in a monitoring area, based on a magnetic field distribution in the monitoring area of a metal instrument measured by a magnetic field sensor array comprising a plurality of magnetic field sensors; and
compute a wall thinning distribution in the monitoring area based on the spatial distribution of the polarized magnetic charges,
wherein the monitoring area is divided in a lattice pattern in a minimum detection area,
wherein the polarized magnetic charges are approximated by continuously disposing the plurality of magnetic dipoles in a unit of a minimum detection area, and
wherein the program further instructing the computer to:
obtain the polarized magnetic charges in the minimum detection area; and
determine a height of the polarized magnetic charge in each of the minimum detection area, which corresponds to a depth of the wall thinning in the monitoring area, to determine the depth of the wall thinning in the monitoring area.

16. The non-transitory computer readable storage medium according to claim 15,
wherein a size of the minimum detection area is set so that a number of observation points, which is a number of the magnetic field sensors, is larger than a number of lattice points of the monitoring area.

17. The non-transitory computer readable storage medium according to claim 15, wherein the program further instructs the computer to:
compute a magnetization direction of the metal instrument;
compute a magnetic field distribution function based on information including the magnetization direction, the magnetic field distribution function indicating a magnetic field distribution at a position of each of the magnetic field sensors at which a single polarized magnetic charge is generated; and
compute the spatial distribution of the polarized magnetic charges based on an estimated value of the magnetic field distribution at a position of each of the magnetic field sensors calculated according to information including the magnetic field distribution function and a measured value of the magnetic field distribution measured by each of the magnetic field sensors.

18. The non-transitory computer readable storage medium according to claim 17, wherein the program further instructs the computer to:
calculate the spatial distribution of the polarized magnetic charges by solving a mathematical programming problem so that a difference between the estimated value and the measured value is a minimum.

* * * * *